US006291078B1

(12) United States Patent
Chen et al.

(10) Patent No.: US 6,291,078 B1
(45) **Date of Patent: *Sep. 18, 2001**

(54) SURFACE COVERINGS CONTAINING ALUMINUM OXIDE

(75) Inventors: Hao A. Chen, Chadds Ford, PA (US); Isaac B. Rufus, Newark, DE (US)

(73) Assignee: Mannington Mills, Inc., Salem, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/956,022

(22) Filed: Oct. 22, 1997

(51) Int. Cl.[7] .................................................. B32B 9/04

(52) U.S. Cl. ....................... 428/543; 428/195; 428/908.8; 428/423.1

(58) Field of Search .......................... 428/76, 698, 908.8, 428/688, 457, 366, 519, 336, 195, 79, 543, 911, 423.1

(56) References Cited

U.S. PATENT DOCUMENTS

| | | | | |
|---|---|---|---|---|
| Re. 32,152 | | 5/1986 | Scher et al. . | |
| Re. 36,359 | | 10/1999 | Ebashi et al. . | |
| 3,726,952 | | 4/1973 | Boden et al. . | |
| 3,787,229 | | 1/1974 | Rudness . | |
| 3,916,046 | * | 10/1975 | Youngberg | 428/31 |
| 3,953,218 | | 4/1976 | Pollard . | |
| 4,005,239 | | 1/1977 | Davis et al. | 428/315 |
| 4,013,598 | | 3/1977 | Evans et al. . | |
| 4,016,130 | | 4/1977 | Antczak | 260/37 N |
| 4,137,357 | | 1/1979 | Emmons | 428/245 |
| 4,196,243 | | 4/1980 | Sachs et al. | 428/147 |
| 4,216,267 | | 8/1980 | Lorenz et al. | 428/412 |
| 4,263,366 | | 4/1981 | Lorenz et al. | 428/332 |
| 4,301,209 | | 11/1981 | Lorenz et al. | 428/339 |
| 4,314,924 | | 2/1982 | Haubennestel et al. . | |
| 4,348,447 | | 9/1982 | Miller, Jr. et al. | 428/144 |
| 4,379,553 | | 4/1983 | Kelly | 273/51 |
| 4,390,580 | | 6/1983 | Donovan | 428/68 |
| 4,395,459 | | 7/1983 | Herschdorfer et al. | 428/391 |
| 4,417,008 | | 11/1983 | Salensky et al. . | |
| 4,418,109 | | 11/1983 | Miller, Jr. et al. | 428/142 |
| 4,443,577 | | 4/1984 | Higgins et al. | 524/590 |
| 4,451,605 | | 5/1984 | Theodore | 524/423 |
| 4,501,790 | * | 2/1985 | Aizawa et al. | 428/283 |

(List continued on next page.)

FOREIGN PATENT DOCUMENTS

| | | |
|---|---|---|
| 1011638 | 6/1977 | (CA) . |
| 1237244 | 2/1968 | (DE) . |
| 2714593 | 10/1978 | (DE) . |
| 4304491 | 8/1994 | (DE) . |
| 19802982 | 8/1999 | (DE) . |
| 19845496 | 4/2000 | (DE) . |
| 0139187 | 5/1985 | (EP) . |
| 0768351 | 10/1996 | (EP) . |
| 0943664 | 9/1999 | (EP) . |
| 10-183059 | 7/1998 | (JP) . |
| WO 94/01406 | 1/1994 | (WO) . |
| WO 0052105 | 9/2000 | (WO) . |

*Primary Examiner*—Merrick Dixon
(74) *Attorney, Agent, or Firm*—Finnegan, Henderson, Farabow, Garrett & Dunner

(57) ABSTRACT

A surface covering comprising at least one layer containing aluminum oxide is disclosed. Preferably, the aluminum oxide is present in the outermost layer of the surface covering which is exposed to the environment. A method to improve wear and/or stain resistance to a surface covering is also disclosed and includes adding an effective amount of aluminum oxide to a top coat layer or outermost layer of a surface covering. Methods of making the surface covering are also disclosed.

13 Claims, 1 Drawing Sheet

U.S. PATENT DOCUMENTS

| | | | | |
|---|---|---|---|---|
| 4,520,062 | | 5/1985 | Ungar et al. | 428/148 |
| 4,526,823 | | 7/1985 | Farrell et al. | 428/35 |
| 4,528,231 | | 7/1985 | Lund | 428/148 |
| 4,529,650 | | 7/1985 | Martinez | 428/336 |
| 4,647,647 | | 3/1987 | Haubennestel et al. . | |
| 4,650,819 | | 3/1987 | Nakamoto et al. | 523/223 |
| 4,689,102 | | 8/1987 | Prawdzik et al. | 156/235 |
| 4,756,951 | | 7/1988 | Wang et al. | 428/204 |
| 4,762,752 | | 8/1988 | Haubennestel et al. . | |
| 4,795,796 | | 1/1989 | Haubennestel et al. . | |
| 4,816,314 | | 3/1989 | Prawdzik et al. | 156/235 |
| 4,857,111 | | 8/1989 | Haubennestel et al. . | |
| 4,869,954 | | 9/1989 | Squitieri | 428/283 |
| 4,871,596 | | 10/1989 | Kamiya et al. | 428/15 |
| 5,049,433 | | 9/1991 | Leotta | 428/195 |
| 5,077,112 | * | 12/1991 | Hensel et al. | 428/76 |
| 5,091,258 | | 2/1992 | Moran | 428/437 |
| 5,151,218 | | 9/1992 | Haubennestel et al. . | |
| 5,167,705 | | 12/1992 | Coughlan | 106/36 |
| 5,188,876 | * | 2/1993 | Hensel et al. | 428/76 |
| 5,254,395 | | 10/1993 | Hodnett, III . | |
| 5,258,225 | | 11/1993 | Katsamberis | 428/331 |
| 5,278,223 | | 1/1994 | Grunenewaelder et al. | 524/502 |
| 5,344,704 | | 9/1994 | O'Dell et al. | 428/323 |
| 5,360,914 | | 11/1994 | Inoue et al. . | |
| 5,395,673 | | 3/1995 | Hunt | 428/148 |
| 5,405,674 | * | 4/1995 | Wang et al. | 428/158 |
| 5,425,986 | * | 6/1995 | Guyette | 428/283 |
| 5,439,969 | | 8/1995 | Sanduja et al. | 524/534 |
| 5,458,953 | * | 10/1995 | Wang et al. | 428/195 |
| 5,478,878 | | 12/1995 | Nagaoka et al. | 524/430 |
| 5,487,939 | * | 1/1996 | Phillips et al. | 428/334 |
| 5,500,253 | | 3/1996 | Sanduja et al. | 427/385.5 |
| 5,505,808 | | 4/1996 | Hallman et al. | 152/233 |
| 5,554,671 | | 9/1996 | Craun et al. . | |
| 5,578,548 | | 11/1996 | Bjork et al. . | |
| 5,643,677 | | 7/1997 | Feifer et al. | 156/233 |
| 5,733,644 | | 3/1998 | Tanaka et al. . | |
| 5,763,048 | | 6/1998 | Takahashi | 428/147 |
| 5,800,904 | | 9/1998 | Hallman et al. . | |
| 5,817,402 | | 10/1998 | Miyake et al. . | |
| 5,830,937 | | 11/1998 | Shalov et al. . | |
| 5,843,576 | | 12/1998 | Rosenberry et al. | 428/423.1 |
| 5,858,160 | | 1/1999 | Piacente et al. . | |
| 5,876,551 | | 3/1999 | Jackson . | |
| 5,891,564 | | 4/1999 | Shultz et al. | 428/324 |
| 5,902,663 | | 5/1999 | Justesen et al. . | |
| 5,910,358 | | 6/1999 | Thoen et al. . | |
| 5,928,778 | | 7/1999 | Takahashi et al. . | |
| 6,008,462 | | 12/1999 | Soltwedel . | |
| 6,022,919 | | 2/2000 | Komoto et al. . | |
| 6,040,044 | | 3/2000 | Takahashi et al. | 428/323 |
| 6,080,474 | | 6/2000 | Oakley et al. | 428/323 |

* cited by examiner

SURFACE COVERINGS CONTAINING ALUMINUM OXIDE

BACKGROUND OF THE INVENTION

1. Field of the Invention

The present invention relates to surface coverings, such as resilient floor coverings or wallpaper, and further relates to methods of preparing the same. The present invention also relates to methods to improve wear and/or stain resistance to surface coverings.

2. Description of Related Art

Present surface coverings, such as resilient flooring, can contain a resilient support surface, a wear surface, and a wear layer top coat. The top coat, in situations where the surface covering is a resilient floor, is subjected to foot traffic and wear from carts and other heavy objects coming in contact with the wear layer top coat. As a result, the top coat deteriorates leading to the exposure of lower layers of the resilient floor such as the wear layer base coat, a print layer, or even the resilient support surface. When the lower layers are exposed and subjected to the environment including foot traffic and other objects, the resilient floor becomes unsightly (e.g., dirty, difficult to clean, and susceptible to stains) and can also be partially or completely destroyed.

While efforts have been made to create more resilient surface coverings, especially in the flooring industry, such efforts have not totally solved the problem of making the wear layer top coat more resilient to the environment it is subjected to. Efforts to make the top coat more resilient have included radiation curable urethane topcoat, waterbase urethane, acrylic, or melamine coatings and the like. However, none of these efforts have proven totally satisfactory. Accordingly, there is a need for an improved surface covering which is more resilient to wear and staining.

SUMMARY OF THE INVENTION

Accordingly, a feature of the present invention is to provide a surface covering which has improved wear and/or stain resistance.

Additional features and advantages of the present invention will be set forth in part in the description which follows, and in part will be apparent from the description, or may be learned by practice of the present invention. The objectives and other advantages of the present invention will be realized and attained by means of the elements and combinations particularly pointed out in the written description including the drawing and appended claims.

To achieve these and other advantages and in accordance with the purpose of the present invention, as embodied and broadly described herein, the present invention relates to a surface covering comprising at least one layer which contains aluminum oxide. Preferably, the aluminum oxide is present in the outermost layer or the top coat layer.

The present invention further relates to a method to improve wear and/or stain resistance to a surface covering. This method includes the steps of adding an effective amount of aluminum oxide to a top coat layer or to a formulation which is used to form a top coat layer.

The invention further relates to a method of making a surface covering which includes the steps of forming a layer comprising aluminum oxide. Preferably, this layer is a top coat layer or the outermost layer.

It is to be understood that both the foregoing general description and the following detailed description are exemplary and explanatory only and are intended to provide further explanation of the present invention, as claimed.

BRIEF DESCRIPTION OF THE DRAWING

The single FIGURE is a graph showing the relationship between particle size of $Al_2O_3$ and concentration and abrasion resistance.

DETAILED DESCRIPTION OF THE PRESENT INVENTION

Figure 1:
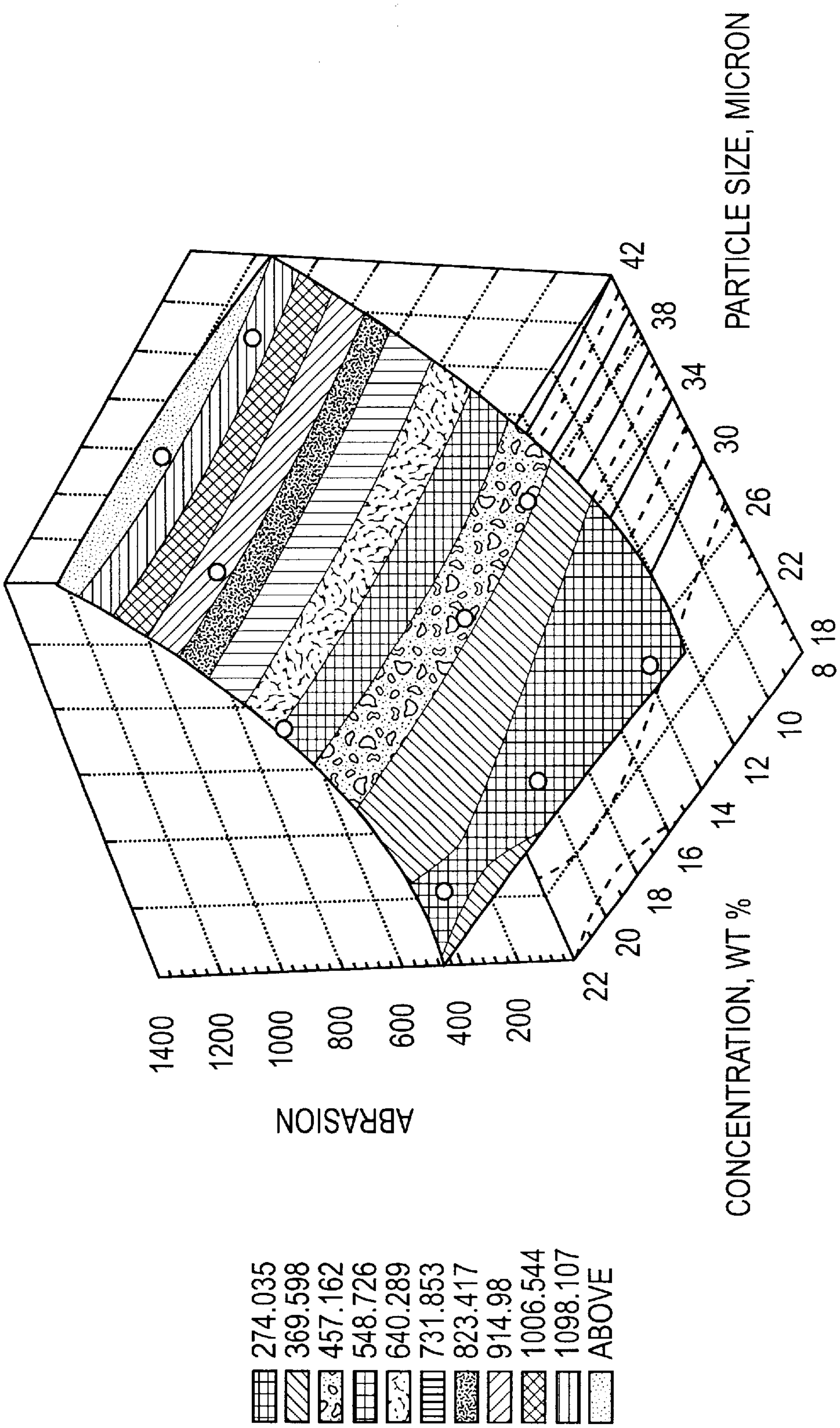

The present invention relates to a surface covering comprising at least one layer containing aluminum oxide. The aluminum oxide used in the present invention is also known as alumina or $Al_2O_3$. Preferably, the aluminum oxide is fused or calcined. The refractive index is preferably from about 1.4 to about 1.7. Surface covering includes, but is not limited to, flooring, wall paper, countertops, automobile dash boards, automotive coatings, and the like.

Generally, a sufficient amount of the aluminum oxide is present in at least one layer of the surface covering to provide improved wear and/or stain resistance to a surface covering as compared to no aluminum oxide being present. Wear resistance can be determined by a Taber abrasion test, a Gardner scrubber test, a walk test and the like. The Taber abrasion test is more commonly used in the flooring industry. One way to determine stain resistance is by staining the sample with different stain amounts and removing the stain after about 1 to 5 hours with solvents. The stain remaining on the sample rated on a scale from 0 to 3, where 0 means no stain showing and 3 means the darkest, visible stain showing.

Preferably, from about 2 g/m$^2$ to about 50 g/m$^2$, and more preferably from about 4 g/m$^2$ to about 20 g/m$^2$ of alumina is present in at least one layer of the surface covering. Alternatively, from about 1% by weight to about 40% by weight of alumina is present in a layer of the surface covering.

Also, while any source of aluminum oxide can be used, it is preferred that the aluminum oxide have the following characteristics: fused or calcined and having a hardness of from about 6 to about 9 on a Moh's scale, and most preferably about 9 on a Moh's scale. Preferably, the particle size of the aluminum oxide is from about 10 microns to about to about 70 microns, and more preferably from about 20 microns to about 50 microns. Sources for preferred aluminum oxide are Washington Mills, N. Grafton, Mass.; ALCOA Industrial Chemicals, Bauxite, Ark.; Composition Materials, Fairfield, Conn.; Micro Abrasives, Westfield, Mass.; and Alu Chem, Inc., Birmingham, Ala.

The aluminum oxide, which is part of at least one layer of the surface covering, can be added in any manner known to those skilled in the art for adding particles to a layer. The aluminum oxide can be mixed into a wet coating or scattered on top of a wet coating. Preferably, the aluminum oxide is applied by a pellet dispenser which applies or sprinkles aluminum oxide on top of a layer which is still “wet” or uncured.

By the layer being “wet” or uncured, the aluminum oxide “sticks” or adheres to the “wet” layer and at least a portion of the aluminum oxide “sinks” into the layer and thus is not exposed to the environment.

The mixing of alumina (and/or other hard particles) with a formulation that forms the wet coating generally requires constant mixing of the coating with alumina to preferably keep the alumina suspended in the coating. Surface treatments of the alumina and the use of other anti-settling agents help in minimizing the settling. However, suspending high concentrations of aluminum oxide in urethane based acrylates or other types of coatings for a long period of time without encountering hard settling of aluminum oxide at the bottom of the storage container is very difficult.

Because of the above mentioned suspension difficulties, sprinkling of alumina on the already formed wet coating or plastisol and then curing the wet coating with the alumina sprinkled thereon is preferred. Several types of scattering machines can be used to accomplish the uniform sprinkling or dispensing of alumina or other hard particles. Normally the scattering machine has rotating, dispensing or applicator roll (engraved or knurled) at the bottom of the hopper. A stationary or rotary brush is used to remove the material from the dispensing or applicator roll. A shaker screen may be used under the hopper for uniform distribution of alumina oxide or other hard particles. The knurl size, the dispending or applicator roll speed, the brush position, the speed of the rotary brush, and the speed and the size of the shaker screen should all be selected based on the amount and the size of the aluminum oxide to be used. Examples of scattering machines that can be used to dispense aluminum oxide or other hard particles of powder according to the invention are a Christyg11 machine (Christy Machine Company, Fremont, Ohio, USA) or a Schilling machine (Emil Paul Schilling AG) or similar dispensing equipment.

If the particles are uniformly suspended in the coating at a fixed coating thickness and weight of alumina, the abrasion resistance will increase as the particle size is increased. Similarly, at a given coating thickness and alumina particle size, the abrasion resistance will be governed by the weight or concentration of alumina in the coating. Table 6 and the FIGURE further exemplify this relationship.

The particle size of alumina is generally proportional to the wear resistance of the coating at a constant coating thickness and fixed amount of alumina. In the same way, at a fixed coating thickness and particle size of alumina, the wear resistance of the cured coating is directly related to the weight of the alumina incorporated in the coating.

The particle size of the alumina is preferably equal to or higher (preferably from 10–60% higher) than the coating thickness in order to achieve high wear resistance. When the hard particles such as alumina protrude above the coating, these hard particles protect the coating from abrading. This method gives very high abrasion resistance to the product. However, when the alumina particles are exposed or not covered by the coating, the particles may act as dirt catchers. Thus, depending on the end use of the product, the coating thickness, the particle size of alumina, and the amount of alumina should be suitably selected.

The coating thickness and the particle size of alumina should be selected depending on the required wear characteristics, product appearance, and other properties of the finished product such as stain resistance, flexibility, cleanability, aesthetics, and styling requirements.

For example, to obtain a smooth-looking product, the coating thickness should be just sufficient to cover the alumina particles when scattered on the wet coating. The other way to accomplish this is to use a multi-layer coat system. In this case, the alumina particles are uniformly scattered on a wet base coat, and then after a partial, full, or no cure, another layer of top coat is applied on the base coat with or without alumina in the top coat. For a smooth coating, the total thickness of the coating (different layers) should be greater than the largest particle size of the alumina used. There are several combinations of this type of construction. For example, a construction can be used where the alumina is placed at different locations in the top coat (see Tables 3 and 6). Another construction would be to sandwich the alumina between two layers of coating. In this type of construction, the curing process is precisely controlled to have intercoat adhesion and other desired properties of the finished product.

In still another type of construction, the coating thickness and the particle size of alumina are chosen in a way that a desired portion of the alumina sinks into the coating and the other part is exposed above the top coat. This gives the product very high wear resistance because the protruding alumina particles offer high wear resistance.

The scattering of alumina should preferably be very uniform and precise. In a typical application, alumina particles are dispensed by industrial or lab scale dispensing machines such as the Christy Machine (Ohio, U.S.A.) or the Emil Paul Schilling AG Scattering Machine (Germany, Switzerland). Application of alumina by scattering machines gives several advantages over the conventional method of mixing and other techniques.

Carborundum, quartz, silica (sand), glass, glass beads, glass spheres (hollow and/or filled), plastic grits, silicon carbide, diamond dust (glass), hard plastics, reinforced polymers and organics, etc., may be substituted for all or part of the alumina.

Once the aluminum oxide is applied to the layer which is "wet" or uncured, the surface covering containing this layer is cured by means known to those skilled in the art, such as radiation curing, UV, electron beam, thermal and/or moisture curing, and the like.

Preferably, the aluminum oxide is present in the outermost layer of a surface covering which is the layer subjected to the environment including foot traffic and other objects coming in contact with the surface covering. Generally, this outermost layer is known as the top coat layer or wear layer top coat. Typically, this wear layer top coat is made of urethane or acrylic, melamine, polyvinylchloride, polyolefins, and the like.

Acrylics, alkyd resins, melamines, conventional clear coats, polyvinyl chloride, polycarbonates, kevlar, epoxy coatings, polyester, polyester acrylates, vinyl-ether-functionalized urethane, epoxysiloxanes, epoxysilicones, multifunctional amine terminated acrylates, acrylate melamines, polyethylene and diene copolymers, and the like, can be used in place of the urethane based acrylates described above. Basically, the wear resistance of any surface or coating can be improved by the incorporation of hard particles such as fused alumina.

For instance, solid vinyl (inlaid) coverings are preferably coated with 1.0–1.8 mil of acrylated urethane based UV-curable top coat. On the wet coat in a typical application, about 5–15 g/m$^2$ of fused alumina with average particle size in the range of about 25–40 microns are applied to this top coat by a modified Christy Machine or by a Schilling scattering machine and then the top coat is cured by UV-light employing either a direct or differential cure mechanism. Depending on the product specification, the amount of alumina and the thickness of the coating can be varied. Also, for example, from about 15 to about 35 g/m$^2$ of alumina (in a layer) in the particle size range of about 50 to about 150 microns could be used in the production of non-slip coverings.

In a preferred embodiment of the present invention, the surface covering is a resilient flooring which contains a resilient support surface. Applied to the top of and adhered to this resilient support surface is a wear surface. The wear surface can contain a wear layer base coat and a wear layer top coat. Also, an initial wear layer can be applied prior to the wear layer base coat which is adhered to the support surface. A strengthening layer can also be present and located anywhere in the resilient surface covering. Preferably, the strengthening layer is present and is in contact with the resilient support surface. The strengthening layer can comprise a vinyl resin and a polymerizable, cross-linkable monomer and can even be disposed between two foam layers. The wear layer base coat can comprise a flexible, thermosettable, polymer composition. The wear layer top coat can comprise a thermosettable, UV curable blend of acrylic or acrylate monomers or urethane. Typically, the top coat comprises a urethane layer and this urethane layer will contain the aluminum oxide.

One preferred design of a surface covering wherein aluminum oxide can be applied to a layer is described in U.S. Pat. Nos. 5,458,953, and 5,670,237 incorporated in their entirety by reference herein. The method of preparing this surface covering can also be used in the present invention with the additional step of adding aluminum oxide to one layer incorporated into this method.

The size and the concentration of the alumina should be optimized based on several properties of the finished products, such as wear resistance, flexibility, stain resistance, gloss, cleanability, appearance, etc. In a typical application, a coating thickness of from about 1.0 to about 1.8 mil with alumina particle size of about 25 to about 35 microns was used at an application rate of about 5 to about 15 grams/m$^2$ of a layer to achieve a smooth look. The alumina particles sank into the wet coating and were covered by the coating. The coating is then cured to achieve smoothness.

Abrasion resistance of the coating or the substrate usually reflects the durability of the product. Abrasion is caused by mechanical actions such as sliding, scraping, rubbing, scuffing, etc. Abrasion results in wearing, marring, staining, and the loss of the surface properties, and eventually the bulk properties of the product.

Abrasion resistance can be related to several properties of the substrate and coating such as hardness, cohesive strength, tensile strength, elasticity, toughness, thickness, etc.

Thus, to test the wear resistance of the product, several test methods have been followed. Some of them are 1) falling sand test ASTM D968; 2) air blast abrasive test ASTM D658; 3) jet abrader, method 6193 of Federal Test Method Standard #141 C, 4) Taber abrader ASTM D4060; 5) NEMA test method LD 3.31; 7) walk test; 8) Taber scratch or modified Hoffman scratch test; and 8) Gardener scrub test, among others.

As stated earlier, with the addition of aluminum oxide, preferably in the outermost layer exposed to the environment, improved wear and/or stain resistance can be achieved. As the examples will show, the improvements in the wear and/or stain resistance are significant and lead to a better surface covering product for consumer use.

The present invention will be further clarified by the following examples, which are intended to be purely exemplary of the present invention.

In testing the product of the invention, the NEMA LD-3.31 test was modified by using 220 grit sandpaper with a 500 grams weight, and changing the paper every 500 cycles. The sandpaper was pasted onto CS-1 7 wheels supplied by Taber. In normal Taber abrasion test, CS-1 7 wheels are used with a 1000 grams weight. The Gardner scrub test employs a 100 grit sandpaper with 577 gram weight.

This test determined the initial or final wear-through or a change in the surface property. In each set of tests, the product without alumina was used as the control.

As a representative of the several hard inorganic and organic material, different amounts of fused or calcined alumina with the characteristics described above were used in the following experiments:

Substrates: vinyl sheet goods (the construction is described in U.S. Pat. No. 5,405,674); solid vinyl tile; homogenous vinyl sheet; and hardwood flooring.

The alumina was sprinkled on wet urethane based acrylate and mixture of acrylates and cured by UV-radiation.

TABLE 1

Effect of weight of fused alumina (aluminum oxide) on homogenous vinyl sheet

| Weight of alumina (30 micron average particle size) g/m$^2$ | Gloss | # of Taber cycles to wear through the top coat[a] |
|---|---|---|
| 0 | 81 | 50 |
| 5 | 81 | 125 |
| 10 | 76 | 150 |
| 15 | 77 | 350 |
| 20 | 79 | 500 |

[a]Modified NEMA test LD3.31

From Table 1, it is clear that as the weight of alumina was increased, the wear resistance of the top coat also increased. Higher amounts of alumina could be incorporated depending on the wear resistance requirement. In a range of 1 g/m$^2$ to 50 g/m$^2$, the other desirable properties of the vinyl sheet goods were not affected. The preferred range of the weight of alumina is about 3 g/m$^2$ to about 40 g/m$^2$. The top coat thickness was varied from about 0.9 to about 1.5 mils. This is a typical example, but different particle sizes and amounts could be used.

TABLE 2

Effect of the particle size of alumina on the wear resistance of homogenous vinyl sheet

| Average particle size of alumina in microns | Weight of alumina (g/m$^2$) | No. of cycles to wear through the top coat[a] |
|---|---|---|
| 0 | 0 | 2500 |
| 30 | 15 | 3000 |
| 40 | 15 | 3750 |

[a]The abrasion was tested by Taber abrader with CS-17 wheels with 1000 grams weight.

The incorporation of alumina into vinyl wear layer also increased the wear resistance of the homogeneous sheet goods.

TABLE 3

Effect of incorporation of alumina in the top coat of solid vinyl sheet (inlaid)

| Weight of alumina (g/m$^2$) | No. of cycles for initial wear through |
|---|---|
| 0 | 50 |
| 5 | 75 |
| 10 | 125 |
| 15 | 150 |

[a]Modified NEMA test DL-3.31

TABLE 4

| Effect of placement of alumina on the wear resistance of solid vinyl sheet | | |
|---|---|---|
| Average weight of alumina (average particle size 30 microns) in the base coat (g/m$^2$) | Average weight of alumina (average particle size 30 microns) in the top coat (g/m$^2$) | Average No. of cycles for initial wear through[a] |
| 0 | 0 | 100 |
| 25 | 25 | 1750 |
| 0 | 25 | 1350 |
| 0 | 15 | 1250 |
| 0 (Vinyl Wear Layer) | 0 | 100 |
| 0 (Vinyl Wear Layer) | 25 | 600 |
| 0 (Vinyl Wear Layer) | 15 | 500 |

[a]Modified NEMA test LD-3.31.

Thus, by properly selecting the particle size, weight, and the location of alumina in a product construction, the desired wear resistance could be achieved.

To demonstrate the excellent wear resistance provided by the incorporation of alumina in the top coat, a Gardener Scrubber test was also conducted.

Gardner Scrub Test Method

The substrate was mounted onto a Gardener scrubber and scrubbed with a 100 grit sandpaper with 577 grams weight for 1000 cycles changing the sandpaper every 500 cycles. The substrate was then stained with oil brown to estimate the extent of wear. The extent of wear is directly related to the extent of staining, with a stain rating of 0 being no stain (excellent wear characteristics without any surface damage) and 3 being worse (with severe surface damage and the loss of top-coat).

TABLE 5

| Effect of incorporation of fused alumina into the top coat of solid vinyl sheet (inlaid) on its wear resistance | |
|---|---|
| Weight of alumina (average particle size 30 micron) incorporated into the top coat (g/m$^2$) | Stain rating after 1000 cycles of scrub |
| 0 | 3 |
| 5–7 | 0.5 |

In general, at a given particle size the wear resistance increases as a function of the amount of alumina (see Tables 1, 3, 4, and 6, and FIG. 1).

In this Example, aluminum oxide was added to a urethane top coat which eventually formed part of a wood floor product.

TABLE 6

Aluminum Oxide in Wood Urethane

| Sample | Number of Cycles for Initial Wear Through | Number of Cycles for Final Wear Through | Overall Coating Thickness in mils | Thickness of Base and Top Coats applied in mils | Number of Passes During Curing Process | Gloss Avg./Std. Dev. |
|---|---|---|---|---|---|---|
| 1 | 159 | 752 | 1.5–1.6 | 0.5/1.0 | 2 | 79.8 ± 12.7 |
| 2 | 394 | 794 | 1.5–1.6 | 1.0/0.5 | 2 | 90.4 ± 1.5 |
| 3 | 528 | 662 | 1.6–1.8 | 1.5 | 1 | 72.4 ± 2.9 |
| 4 | 274 | 943 | 1.6–1.7 | 0.5/1.0 | 2 | 68.4 ± 18.1 |
| 5 | 529 | 957 | 1.8–2.0 | 1.0/0.5 | 2 | 82.8 ± 6.3 |
| 6 | 549 | 775 | 1.7–1.8 | 1.5 | 1 | 55.6 ± 1.7 |
| 7 | 97 | 223 | 1.4–1.6 | 0.5/1.0 | 2 | 84 ± 7.6 |
| 8 | 111 | 305 | 1.5–1.8 | 1.0/0.5 | 2 | 90.2 ± 1.3 |
| 9 | 78 | 143 | 1.3–1.5 | 1.5 | 1 | 80.6 ± 5.4 |

Notes:
Samples 1–3, aluminum oxide with average particle size of 25 microns used at 10 g/m$^2$ application rate.
Samples 4–6, aluminum oxide with average particle size of 25 microns used at 20 g/m$^2$ application rate.
Samples 7–9, no aluminum oxide used.
Aluminum oxide sifted through 400 mesh screen.

Application Method
No. 6 mire rod used for 0.5 mil. draw.
No. 8 mire rod used for 1.0 draw.
No. 14 mire rod used for 1.5 draw.

| Curing Conditions | Watts/Watts | Curing energy in milli Joules/cm$^2$ |
|---|---|---|
| First pass samples 1, 2, 4, 5, 7, and 8 | 125/off | 200 |
| Second pass samples 1, 2, 4, 5, 7, and 8 | 200/200 | 1030 |
| One pass cure samples 3, 6, | 200/200 | 1030 |

The "Number of Cycles for Initial Wear Through" is the number of cycles until the first spots of abrasion through the topcoat and stain of the wood was first noticed. All abrasion testing was done per modified NEMA testing methods.

Other embodiments of the present invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A resilient surface covering having improved wear and/or stain resistance comprising a wear layer comprising a urethane based acrylate containing aluminum oxide.

2. The surface covering of claim 1, wherein said wear layer includes a bottom coat layer and a top coat layer or an outermost layer and wherein said top coat layer or said outermost layer contains said urethane based acrylate containing said aluminum oxide.

3. The surface covering of claim 1, wherein said aluminum oxide is calcined or fused aluminum oxide.

4. The surface covering of claim 2, wherein said bottom coat layer comprises polyvinylchloride.

5. The surface covering of claim 1, wherein said aluminum oxide is present in an amount of about 1 g/m$^2$ to about 50 g/m$^2$ of said wear layer.

6. The surface covering of claim 5, wherein said aluminum oxide is present in an amount of about 3 g/m$^2$ to about 25 g/m$^2$ of said wear layer.

7. The surface covering of claim 4, wherein said bottom coat layer further comprises aluminum oxide.

8. The surface covering of claim 1, wherein said aluminum oxide has an average particle size of about 10 to about 70 microns.

9. The surface covering of claim 8, wherein said aluminum oxide has an average particle size of about 25 to about 35 microns.

10. The surface covering of claim 1, wherein said aluminum oxide is placed between two coatings.

11. The surface covering of claim 2, wherein said bottom coat layer contains said urethane based acrylate containing said aluminum oxide.

12. The surface covering of claim 1 which is a wood floor product.

13. The surface covering of claim 1, wherein the wear layer includes at least a bottom coat layer and a top coat layer and the aluminum oxide is present in at least one of said bottom or top coat layers.

* * * * *